United States Patent [19]

Pritchard

[11] Patent Number: 4,466,016
[45] Date of Patent: Aug. 14, 1984

[54] TELEVISION SIGNAL FILTERING SYSTEM
[75] Inventor: Dalton H. Pritchard, Princeton, N.J.
[73] Assignee: RCA Corporation, New York, N.Y.
[21] Appl. No.: 267,634
[22] Filed: May 27, 1981
[51] Int. Cl.³ .......................................... H04N 9/535
[52] U.S. Cl. ....................................... 358/31; 358/40
[58] Field of Search ..................... 358/31, 39, 40, 37, 358/38

[56] References Cited
U.S. PATENT DOCUMENTS

| | | | |
|---|---|---|---|
| 3,546,372 | 12/1970 | Dischert et al. | |
| 3,715,477 | 2/1973 | Olson et al. | |
| 3,780,215 | 12/1973 | Shibata et al. | |
| 3,836,707 | 8/1974 | Murakami et al. | |
| 3,858,240 | 12/1974 | Golding et al. | 358/13 |
| 3,919,714 | 11/1975 | Bingham | 358/27 |
| 3,938,181 | 2/1976 | Avins | 358/38 |
| 4,041,531 | 8/1977 | Bingham | 358/37 |
| 4,052,736 | 10/1977 | Griffiths | 358/37 |
| 4,072,984 | 2/1978 | Kaiser | 358/31 |
| 4,092,618 | 5/1978 | Guidoux | 330/70.7 |
| 4,096,516 | 6/1978 | Pritchard | |
| 4,143,396 | 3/1979 | Mackenzie | 358/37 |

FOREIGN PATENT DOCUMENTS

| | | |
|---|---|---|
| 31270 | 7/1981 | European Pat. Off. |
| 2403233 | 1/1980 | Fed. Rep. of Germany . |
| 2003695 | 3/1979 | United Kingdom .................. 358/31 |
| 2022544A | 12/1979 | United Kingdom . |
| 2027309 | 2/1980 | United Kingdom . |

OTHER PUBLICATIONS

A CCD Comb Filter for Color TV Receiver Picture Enhancement, by D. H. Pritchard, RCA Review, vol. 41, No. 1 Mar. 1980, pp. 3 to 28.

Primary Examiner—Tommy P. Chin
Attorney, Agent, or Firm—E. M. Whitacre; P. J. Rasmussen; E. P. Herrmann

[57] ABSTRACT

A signal separation system is provided which includes a plurality of serially-coupled signal transfer stages. A video information signal is applied to an input stage and is delayed by at least the time interval of one horizontal television line (1-H) as it passes through the stages. Various ones of the stages which are 1-H apart in time include outputs, which are combined by weighting function and summing or difference circuits to produce bandwidth-limited transversal filter output signals. These signals are additively and subtractively combined to produce a combed band passed chrominance signal and a fully restored and combed luminance signal, thereby obviating the need for subsequent filtering before the signals are further processed. The bandwidth-limited signals may also be combined to provide a user adjustable peaking control signal for the luminance information channel.

12 Claims, 10 Drawing Figures

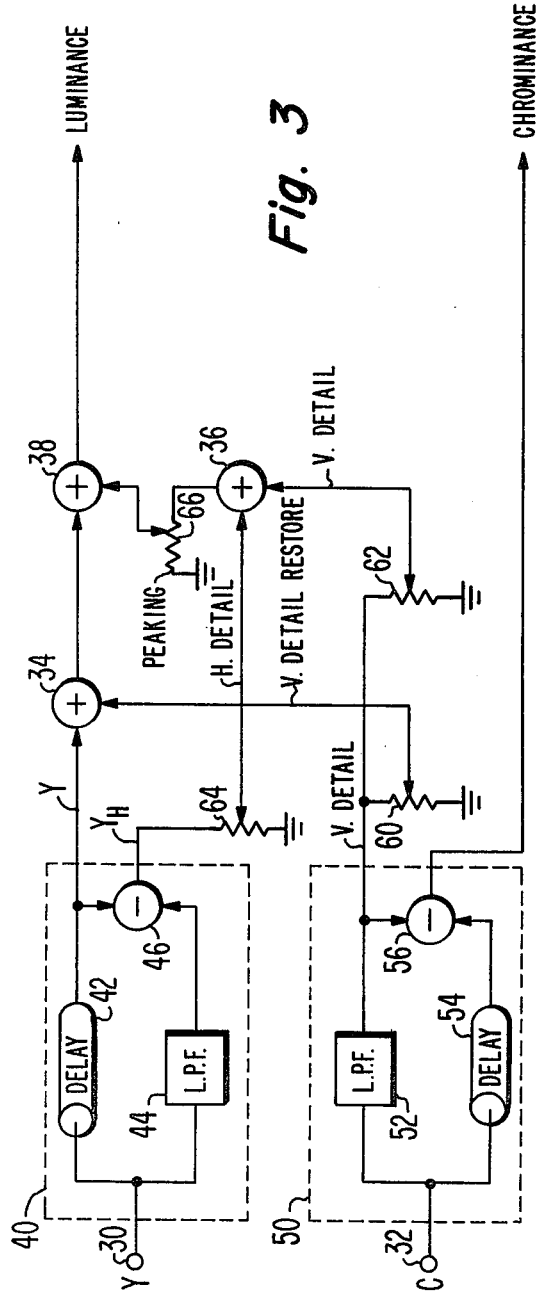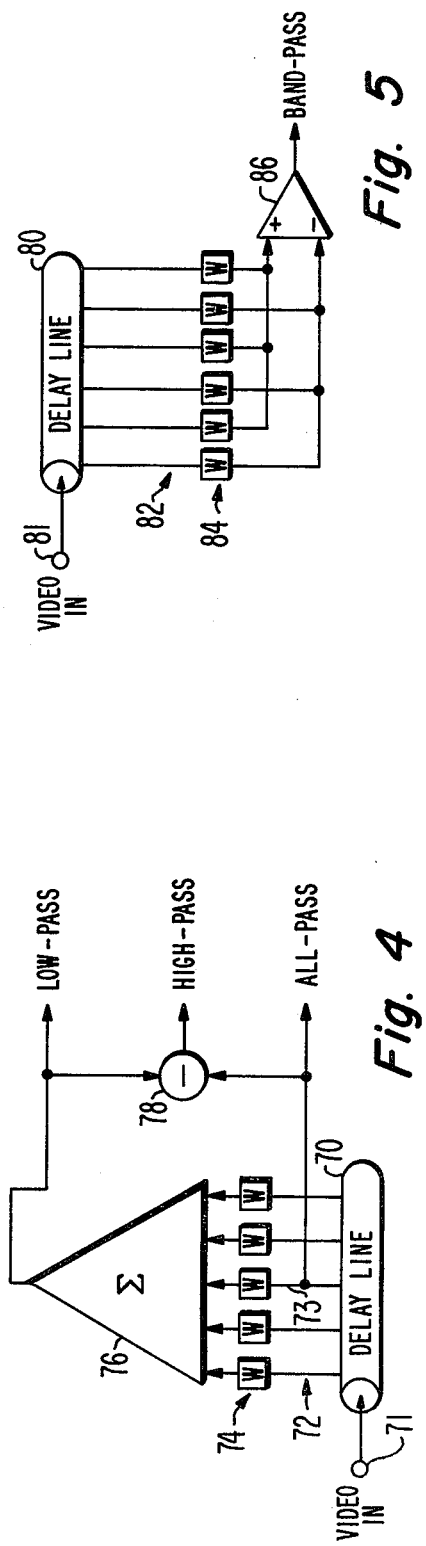

TELEVISION SIGNAL FILTERING SYSTEM

This invention relates to television signal filtering systems and, in particular, to systems for separating television luminance and chrominance signals for subsequent video information processing.

The video detector of a television receiver produces a composite baseband video signal. In order to develop the signals necessary to produce an image on the television kinescope, it is necessary to separate the luminance and chrominance signal components of the composite signal. The luminance and chrominance signals are separately processed, then recombined to produce the usual red, green and blue signals for the kinescope. The luminance and chrominance signals may be partially separated by the use of bandpass and lowpass filters, or may be more advantageously separated with greater accuracy by a comb filter, as described in my article entitled "A CCD Comb Filter for Color TV Receiver Picture Enhancement", published in the "RCA Review", Vol. 41, March 1980 at pages 3 et seq. The comb filter takes advantage of the interlaced nature of the luminance and chrominance signal information in the standard NTSC color signal to separate the two signal information components over the full video band. In addition, the comb filter described in the above-mentioned article includes provision for enhancing the reproduction of the vertical detail of the luminance information component.

The techniques of comb filter luminance and chrominance signal separation are advantageously used in the comb filter system described in my U.S. Pat. No. 4,096,516. In the system there shown, the video signal is delayed through the use of integrated circuit charge coupled device delay lines to separate the interleaved luminance and chrominance signals in complementary fashion at two integrated circuit output terminals. However, filtering of the combed output signals is necessary before the signals can be processed for color signal reproduction. In particular, the combed chrominance signal must be filtered by a bandpass or a high-pass filter arranged to pass chrominance signal components while rejecting frequencies outside the chrominance signal band. The bandpass filter illustratively shown in this patent is comprised of discrete circuit elements located external to the integrated circuit, and produces a band passed chrominance signal for a chrominance signal processor.

The luminance signal is also filtered by an external lowpass filter. The signal at the chrominance output terminal is filtered by an external lowpass filter for recovery of luminance vertical detail information located in the low frequency portion (i.e., between 0 and about 1.5 MHz) of the combed chrominance output. The filtered luminance signal and the vertical detail information are then combined to provide a restored luminance signal for subsequent signal processing.

In order to eliminate the numerous filter components referred to above, it is desirable to provide the bandpass and lowpass filtering of the two signals on the comb filter integrated circuit chip. It is also desirable to restore high frequency horizontal detail information to the luminance signal, which is undesirably removed by the luminance lowpass filter. Moreover, it is desirable to allow the user to adjust the amount of horizontal and vertical detail contained in the luminance signal through the use of a common peaking control.

When a comb filter system is employed in a television receiver, it must be recognized that the chrominance information will experience considerable delays due to filtering provided in the chrominance signal processor. These chrominance signal delays are conventionally matched by a delay line in the luminance signal path so that the processed luminance and chrominance signals will be in a properly timed relationship when they are matrixed together to produce the color signals for the kinescope. Accordingly, it is further desirable to provide means for advancing the timing of the chrominance signal in the comb filtering system to eliminate much or all of the required matching luminance signal delay in the television system.

In accordance with the principles of the present invention, a signal separation system is provided which includes a plurality of serially-coupled signal transfer stages. A video information signal is applied to an input stage and is delayed by at least the time interval of one horizontal television line (1-H) as it passes through the stages. Various ones of the stages which are 1-H apart in time include outputs, which are combined by weighting function and summing or difference circuits to produce bandwidth-limited transversal filter output signals. These signals are additively and subtractively combined to produce a combed band passed chrominance signal and a fully restored and combed luminance signal, thereby obviating the need for subsequent filtering before the signals are further processed. The bandwidth-limited signals may also be combined to provide a user adjustable peaking control signal for the luminance information channel.

In accordance with a further aspect of the present invention, the tapped stages used to develop the chrominance signal precede those tapped stages used to develop the luminance signal. Accordingly, the resulting chrominance signal is advanced in time with respect to the luminance signal, thereby compensating for the delays encountered by the chrominance signal during processing of the chrominance information. The necessity for a substantial luminance delay line is thereby avoided.

The combed and bandwidth-limited luminance and chrominance signals developed in accordance with this invention may be produced by circuitry constructed on a single integrated circuit without the use of external filter circuit elements.

In the drawings:

FIGS. 1b and 1c illustrate waveforms depicting the response characteristics of the comb filter arrangement of FIG. 1a;

FIGS. 2b and 2c illustrate waveforms depicting the response characteristics of the comb filter arrangement of FIG. 2a;

FIG. 3 illustrates, partially in block diagram form and partially in schematic diagram form, a system for filtering combed luminance and chrominance signals and for developing a luminance peaking signal in accordance with the principles of the present invention;

FIGS. 4 and 5 illustrate transversal filters of the types used in the signal separation systems of FIGS. 3, 6 7 and 9;

Figure 1A:
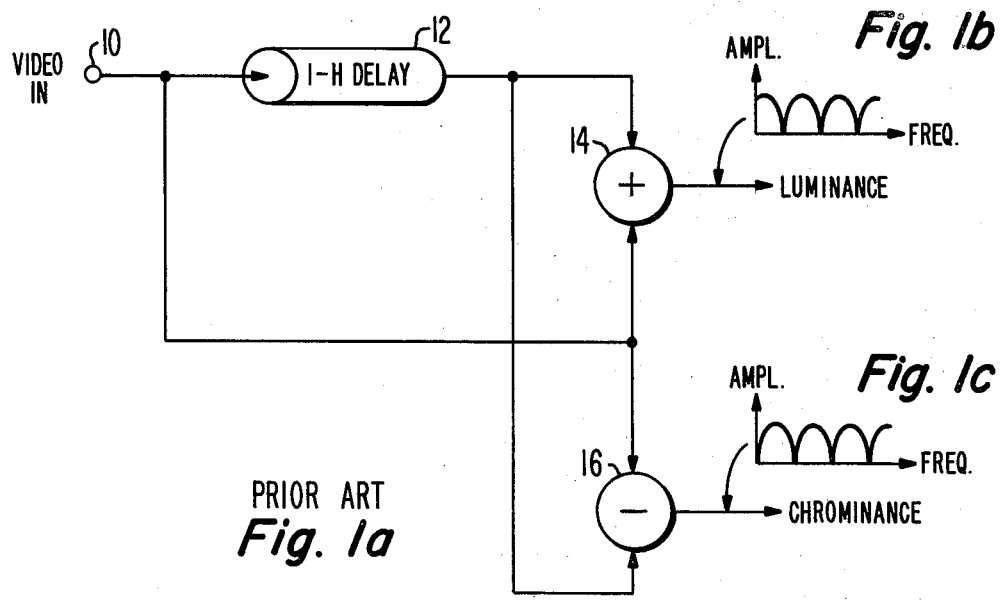
FIG. 1a illustrates in block diagram form a 1-H comb filter arrangement of the prior art.

Referring to FIG. 1a, a typical 1-H comb filter signal separation circuit is shown. A video signal is applied to an input terminal 10, from which it is applied to the input of a 1-H delay line 12, an input of an additive signal combining network 14, and an input of a subtractive signal combining network 16. The output of the 1-H delay line 12 is coupled to second inputs of the two combining networks 14 and 16. A comb filtered luminance signal is produced at the output of the additive combiner 14, and a comb filtered chrominance signal is produced at the output of the subtractive combiner 16. The subtractive signal combining network 16 may be constructed in the same manner as the additive combining network 14, with an inverter employed at one input to invert one of the input signals.

The outputs of the combining networks 14 and 16 exhibit response characteristics as shown in FIGS. 1b and 1c. FIG. 1b shows the response at the luminance output, which is characterized by a series of cusped response curves with points of maximum attenuation separated by the inverse of the delay time (1-H equals 15,734 Hz in the NTSC color system). The combed luminance response is seen to exhibit a point of minimum attenuation at zero Hz, and thereafter repetitive peaks of minimum attenuation at the inverse of the 1-H delay time. Interleaved chrominance signals are cancelled by the combiner 14 by virtue of the fact that the chrominance signal components at the inputs to the combiner 14 are in phase opposition, due to the 1-H delay and the line-to-line phase alteration of the chrominance signal.

In a complementary manner, the subtractive combination of the delayed and undelayed video signals in combiner 16 produces a response as shown in FIG. 1c for the chrominance output. By virtue of the subtractive combination of the signals, the chrominance signals which are in phase opposition at the combiner inputs reinforce each other in the output signal, and the luminance signal components cancel each other. The result is a cusped response characteristic with points of maximum attenuation starting at zero Hertz and separated by the inverse of the 1-H delay time.

Figure 2A:
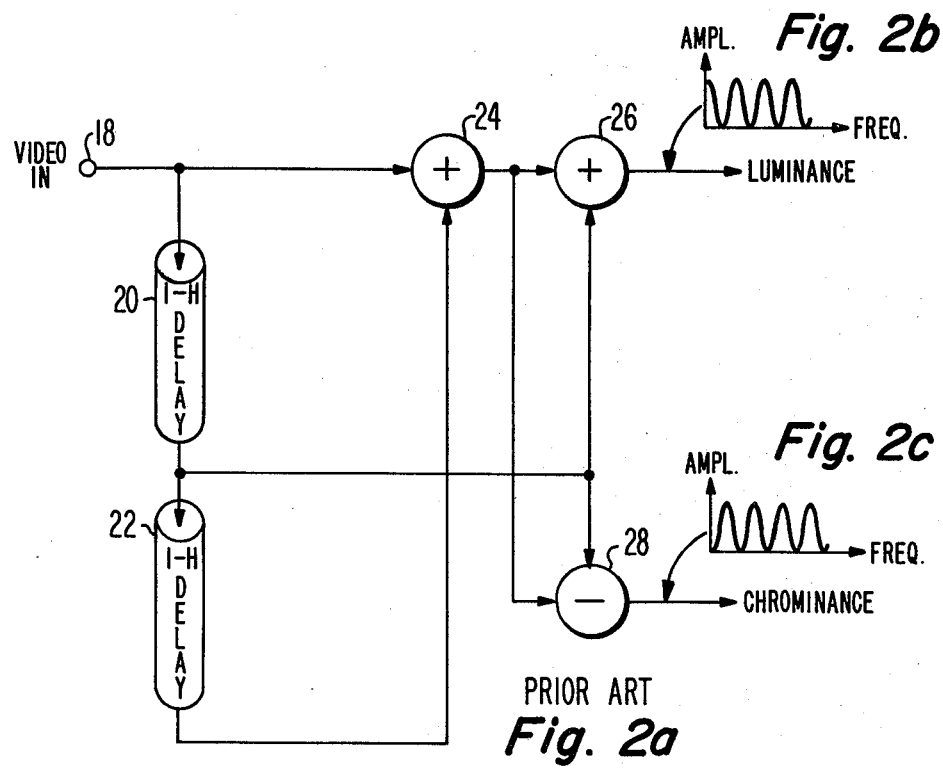
FIG. 2a illustrates in block diagram form a 2-H comb filter arrangement of the prior art.

FIG. 2a illustrates the principles of a 2-H comb filter signal separation circuit. A video signal is applied to an input terminal 18, which is coupled to the input of a 1-H delay line 20 and an input of an additive signal combiner 24. The output of the 1-H delay line 20 is coupled to the input of a second 1-H delay line 22, and to inputs of an additive signal combiner 26 and a subtractive signal combiner 28. The output of the second 1-H delay line 22 is coupled to a second input of the additive combiner 24, the output of which is coupled to second inputs of combiners 26 and 28.

The combiner 24 combines video signals which are delayed from each other by two line intervals (2-H). These signals contain chrominance information in phase synchronism due to the two line delay. The combined signal produced by combiner 24 is additively combined with a 1-H delay signal in combiner 26 to develop an offset sinusoidal response characteristic at the output of the combiner 26, as shown in FIG. 2b. Interleaved chrominance signal components are thereby attenuated at the output. Like the cusped response characteristic of FIG. 1b, the offset sinusoidal characteristic of FIG. 2b provides minimum attenuation at zero Hz, and repetitive signal nulls separated by the inverse of the 1-H delay time.

In a complementary manner, the subtractive combiner 28 causes reinforcement of the chrominance components of the applied signals and cancellation of the interleaved luminance signal components. The resultant chrominance response characteristic is shown in FIG. 2c. The response characteristic of FIG. 2c exhibits an offset sinusoidal shape, with nulls beginning at zero Hz and recurring at intervals separated by the inverse of the 1-H delay time. The sinusoidal response characteristic is advantageous because it provides broader combing in the vicinity of the signal null frequencies, and therefore greater attenuation of the signals to be removed.

In order to provide a maximum amount of signal combing, the signals applied to the additive combiner 24 conventionally exhibit one-quarter amplitudes relative to the combed output signals of combiners 26 and 28. Their combination will thus provide half-amplitude signal levels. The output signals of the first delay line 20 will similarly exhibit half-amplitudes relative to the combed output signal levels, resulting in the application of half-amplitude signals to combiners 26 and 28. The combed output signals produced will therefore exhibit nominally unity amplitudes with maximum cancellation at the response characteristic null frequencies.

FIG. 3 shows an arrangement responsive to combed luminance (Y) an chrominance (C) signals which provides bandwidth limiting and a peaking adjustment signal. The arrangement of FIG. 3 may be advantageously used in accordance with the principles of the present invention to produce a band passed combed chrominance signal and a combed and peaked luminance signal.

In FIG. 3, combed luminance and chrominance signals are applied to input terminals 30 and 32, respectively. The luminance signal is applied to a filter arrangement 40, including a delay element 42, a lowpass filter 44, and a subtractive combining network 46. The delay of the delay element 42 is chosen to substantially equal the delay imparted to the applied signals by the lowpass filter 44. The inputs of the delay element 42 and the lowpass filter 44 are coupled to the terminal 30, and their outputs are coupled to the inputs of the subtractive combining network 46. Since the subtractive combining network subtracts a lowpass filtered signal from a broad band signal, it will exhibit a high pass filter characteristic at its output. The output of the combiner 46 is coupled by way of a potentiometer 64 to an input of an additive combining network 36. The output of the delay element 42 is also coupled to the input of an additive combining network 34.

The chrominance signal at terminal 32 is applied to the input of a second filter arrangement 50, including a second lowpass filter 52, a second delay element 54, and a second subtractive combining network 56. The delay of the delay element 54 is chosen to substantially equal the delay imparted to the applied signals by the lowpass filter 52. The inputs of the delay element 54 and the lowpass filter 52 are coupled to the terminal 32, and their outputs are coupled to the inputs of the subtractive combining network 56. Like network 46, the combining network 56 will exhibit a high pass filter characteristic at its output. The output of the lowpass filter 52 is coupled by way of a potentiometer 60 to a second input of the additive combining network 34, and by way of a potentiometer 62 to a second input of the additive combining network 36.

The combined signals at the output of the combining network 34 are applied to an input of an additive combining network 38. The combined signals at the output of the combining network 36 are applied to a second input of combining network 38 by way of a peaking control potentiometer 66. A combed and restored luminance signal is produced at the output of the combining network 38, and a high pass filtered and combed chrominance signal is produced at the output of the combining network 56.

Low frequency luminance information, referred to as vertical detail information, is contained in the low frequency portion of the combed chrominance response characteristic. This vertical detail information is provided at the output of the lowpass filter 52, and is subtracted from the broad band chrominance signal by the subtractive combining network 56 to develop a highpass signal containing the desired combed chrominance information of the chrominance passband. The vertical detail information, denoted as V. detail in FIG. 3, is inserted into the combed luminance signal at the output of the delay element 42 by the combining network 34 to produce a luminance signal in which the vertical detail information has been restored. High frequency combed luminance information at the output of combining network 46, referred to as $Y_H$, provides horizontal detail in the reproduced image, and is added to the vertical detail information by the combining network 36. The resultant combined signal contains both horizontal and vertical detail information, and is added to the restored luminance signal by combining network 38 in an amount depending upon the setting of the peaking control potentiometer 66. The luminance signal at the output of the combining network 38 thus comprises a restored luminance signal with peaking information added so as to provide a reproduced image with a desirable amount of both vertical and horizontal detail. Potentiometers 60, 62 and 64 determine the amount of detail included in the restored luminance signal and the peaking signal.

The filter arrangements 40 and 50 may advantageously be constructed as shown by the transversal filter arrangement of FIG. 4. A video signal is applied to an input terminal 71, which is coupled to the input of a delay line 70. The delay line 70 includes a plurality of output taps, shown at 72. The center one of the plurality of output taps is coupled to apply a broadband (all pass) output signal to a subtractive combining network 78. A weighting function circuit "W" is connected in series with each output tap, as shown at 74. Each weighting function circuit modifies the respective tapped output signal by a predetermined amount, which amount may vary from one tap to another. Usually, each output tap signal is multiplied by a fractional constant weighting function value to develop a weighted signal. The weighted signals are summed together by a summing circuit 76, which exhibits a lowpass filter characteristic at its output. The choice of the number of taps, the tap spacing, and the weighting function values determine the characteristic of the low pass transversal filter, such as its cutoff frequency, rolloff, etc. The subtractive combining network 78 subtracts the lowpass signal from the all pass signal to derive a high pass filtered signal at its output. The center tap 73 is chosen to provide the all pass signal because signals at this tap location exhibit a median delay with respect to the summed output taps.

In a somewhat similar manner, the transversal filter arrangement of FIG. 5 may be used to provide a bandpass filter characteristic. Video signals are applied to an input terminal 81, which is coupled to the input of a tapped delay line 80. Output taps, shown at 82, are coupled to weighting function circuits, shown at 84, to develop weighted tapped signals as in the case of the arrangement of FIG. 4. Alternate ones of the weighted signals are combined and the combined signals are then differentially combined by a differential circuit 86. The differential circuit 86 will exhibit a bandpass characteristic at its output, the specific characteristics of which are determined by the choice of the number of taps, the tap spacing (i.e., the time delay between taps), and the values of the weighting functions.

Figure 6:
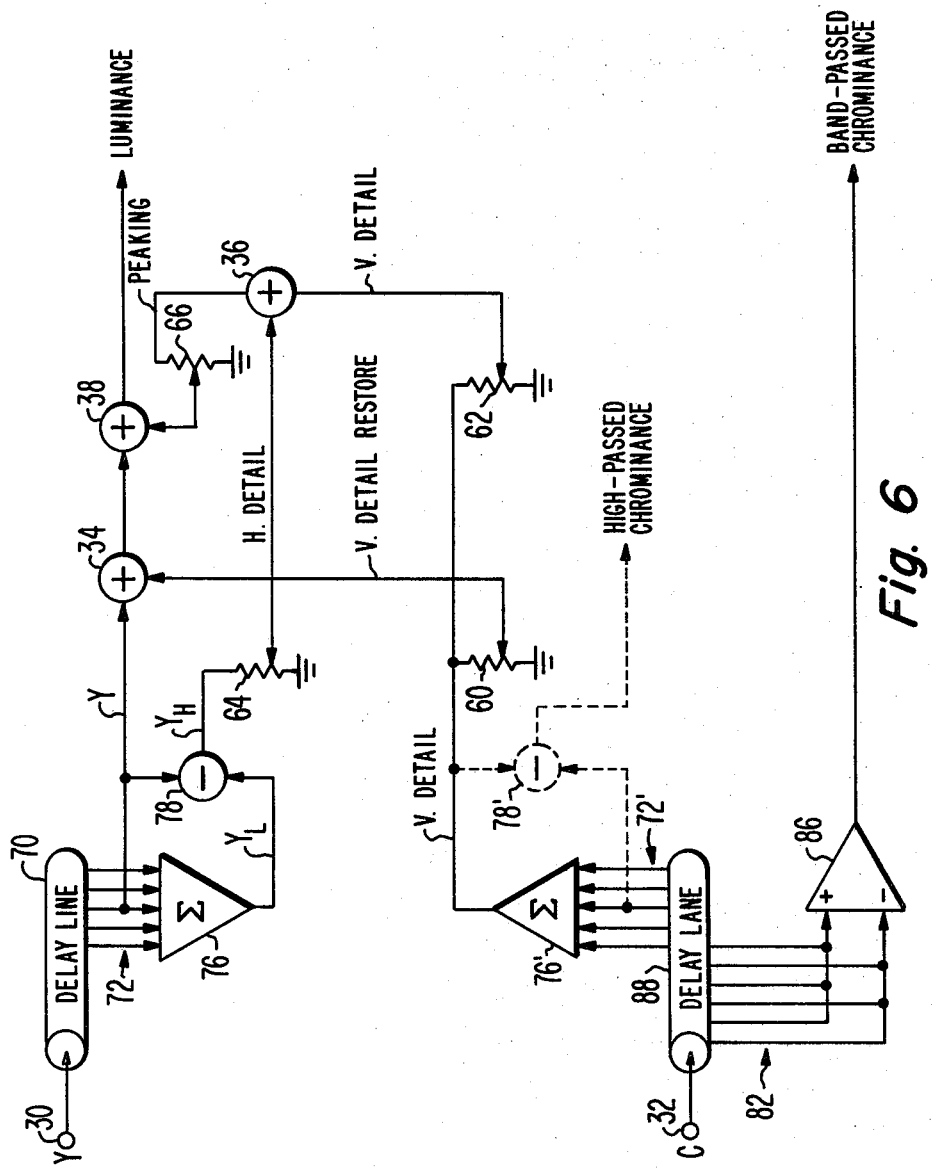
FIG. 6 illustrates, partially in block diagram form and partially in schematic diagram form, a filtering and peaking signal system utilizing transversal filters in accordance with the principles of the present invention.

In FIG. 6, the principles of the filter arrangements of FIGS. 4 and 5 are utilized in accordance with the principles of the arrangement of FIG. 3 to develop a combed, restored and peaked luminance signal and a bandpassed chrominance signal. Reference numerals used in FIGS. 3, 4 and 5 have been retained to identify similar elements in FIG. 6. In FIG. 6, the weighting function circuits have been omitted from the delay line taps to clarify the drawing, but it is to be understood that the tapped signals are properly weighted before they are combined in accordance with the principles of the arrangements of FIGS. 4 and 5.

In FIG. 6, combed luminance and chrominance signals are applied to input terminals 30 and 32. Terminal 30 is coupled to the input of the delay line 70, which includes output tap lines shown at 72. The tapped output signals from the delay line 70 are weighted and summed by summer 76 to produce a low passed combed luminance signal $Y_L$. The low passed luminance information $Y_L$ is subtracted from the all-passed signal taken from the center tap of the delay line 70 by the subtractive combining network 78. The network 76 therefore will produce a high pass signal $Y_H$, which contains horizontal detail information of the combed luminance signal. As in FIG. 3, the horizontal detail information is applied to combining circuit 36.

The combed chrominance signal at terminal 32 is applied to the input of a delay line 88. A first series of output taps of the delay line 88, shown at 82, are weighted and alternately combined at inputs of differential circuit 86. The differential circuit 86 will therefore produce a combed, bandpassed chrominance signal at its output.

The delay line 88 also includes a second series of output taps, as shown at 72'. The signals at these taps are weighted and summed by summer 76' to produce a low passed combed chrominance signal. As explained above, as low frequencies the chrominance comb filtered signal comprises vertical detail information of the luminance signal. The vertical detail information is applied to combining network 34 to produce a fully restored luminance signal, and to combining network 36 to produce a peaking signal. The combining networks 34, 36 and 38 and the potentiometers 60, 62, 64 and 66 function in the same manner as the correspondingly numbered elements of FIG. 3.

If a high-passed chrominance signal is desired instead of the bandpassed signal, a subtractive combining network 78', shown in dashes, may be used. The network 78' subtracts the low passed chrominance signal (containing vertical detail information) from the all-pass signal at the center one of the taps shown at 72' to produce a high passed chrominance signal.

In FIG. 6, the output taps at 82 which are used to develop the bandpassed chrominance signal precede the output taps at 72' which are used to recover the vertical detail information. The taps 72' are in alignment in time with the taps at 72 of delay line 70 so that the signal components applied to networks 34 and 36 are in substantial phase synchronism. Since the chrominance taps at 82 precede the luminance signal taps 72 and 72', the bandpassed chrominance signal will be advanced in time with respect to the luminance signal at the output of combining network 38. The time advance of the chrominance signal is provided to account for the delays encountered by the chrominance signal as it is processed by subsequent bandwidth restricted circuitry in the television receiver (not shown) before the processed luminance and chrominance signals are matrixed together. By choosing chrominance taps 82 to be sufficiently advanced in time with respect to the luminance taps 72 and 72', it is possible to eliminate the need for the usual luminance delay line in the television receiver.

Figure 7:
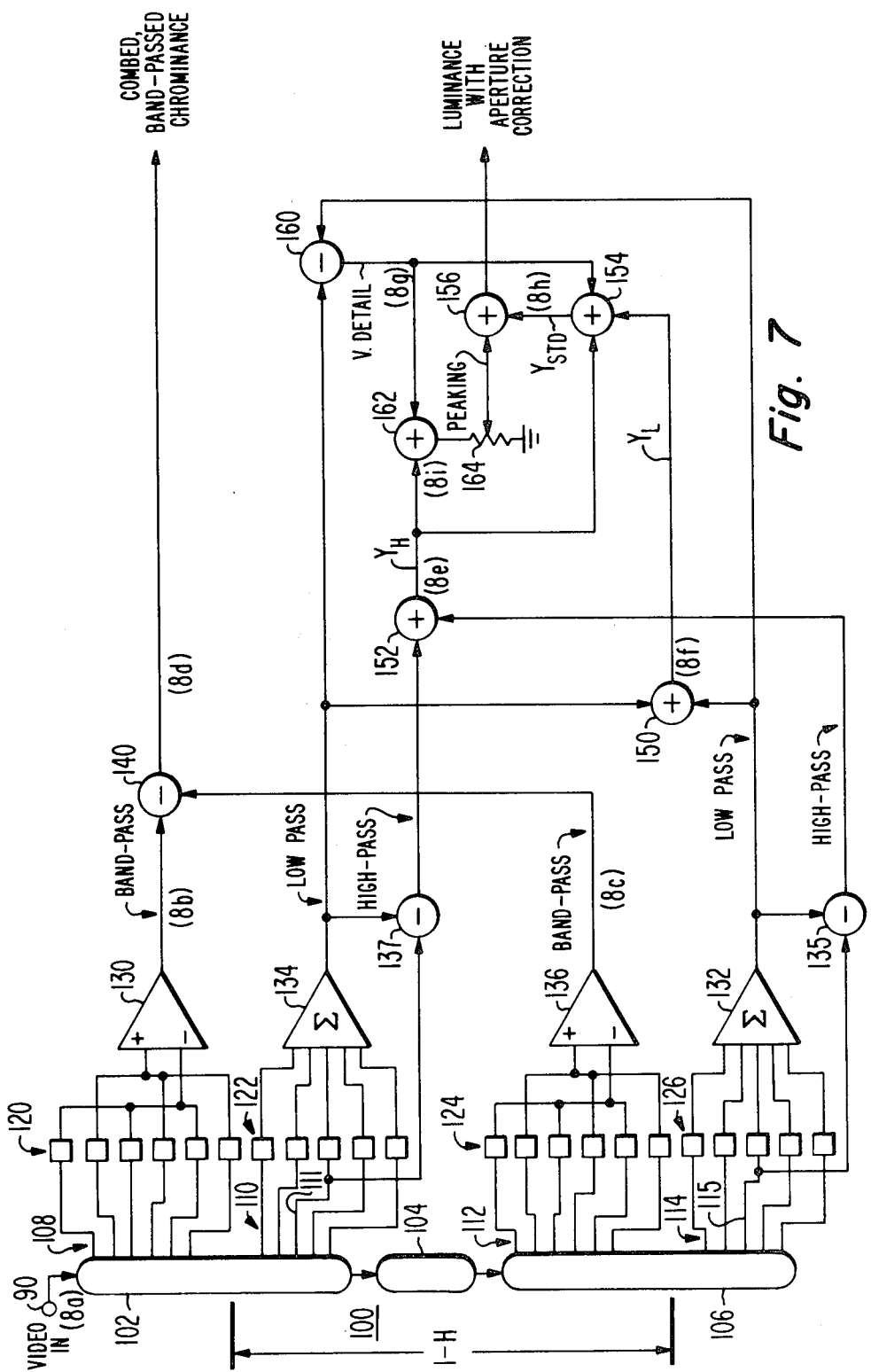
FIG. 7 illustrates, partially in schematic diagram form and partially in block diagram form, a signal separation system constructed in accordance with the principles of the present invention using a 1-H comb filter.

In FIG. 7, a 1-H television signal separation system constructed in accordance with the present invention is illustrated in which the luminance and chrominance signal are filtered and separated by comb filtering, and full aperture correction (i.e., both horizontal and vertical peaking) is provided. With the exception of a peaking control potentiometer, the entire system may be advantageously constructed on a single monolithic integrated circuit chip.

A video signal is applied to an input terminal 90, which is coupled to the input of a delay line 100. The delay line 100 may comprise a charge-coupled device delay line, in which samples of the video signal are clocked through successive ones of the delay line devices. If the video signal is in digital form, the delay line 100 may comprise a shift register. The delay line 100 has a length which provides a total delay which is slightly in excess of the time of one horizontal television line (1-H). The delay line is comprised of three major sections, shown as 102, 104 and 106. Sections 102 and 106 comprise the initial and final stages of the delay line 100, and include output taps as shown at 108, 110, 112 and 114. Intermediate the tapped sections 102 and 106 is the section 104 which provides a major portion of the 1-H delay. Output taps shown at 112 are delayed by 1-H with respect to corresponding taps shown at 108. Likewise, taps shown at 114 are delayed by 1-H with respect to corresponding taps located as shown at 110.

The output taps as shown at 108, 110, 112 and 114 are coupled to weighting function circuits shown at 120, 122, 124 and 126, respectively. Alternate ones of the weighted taps of the weighting function circuits at 120 are summed at the inputs of a differential circuit 130, which differentially combines the summed signals to produce a bandpass filter characteristic at its output. The bandpassed signal at the output of comparator 130 is applied to one input of a subtractive combining network 140.

Similarly, alternate ones of the weighted taps shown at 124 are summed at the inputs of a differential circuit 136, which exhibits a bandpass filter characteristic at its output. The output of differential circuit 136 is coupled to a second input of the subtractive combining network 140.

The output taps at 110 are weighted and applied to a summing circuit 134, which exhibits a lowpass filter response characteristic at its output. The output of summing circuit 134 is coupled to an input of subtractive combining networks 137 and 160 and to an input of an additive combining network 150. An output tap 111 is centered with respect to the taps shown at 110 and is coupled to a second input of the subtractive combining network 137. The subtractive combining network 137 subtracts a lowpass filter signal at the output of summing circuit 134 from the broadband signal at output tap 111 and therefore exhibits a high pass filter characteristic at its output, which is coupled to an input of an additive combining network 152.

The output taps at 114 are weighted and applied to a summing circuit 132, which exhibits a lowpass filter response characteristic of its output. The output of summing circuit 132 is coupled to inputs of subtractive combining networks 135 and 160 and to a second input of additive combining network 150. An output tap 115 is centered with respect to the taps shown at 114 and is coupled to a second input of the subtractive combining network 135. The subtractive combining network 135 subtracts a lowpass filtered signal at the output of summing circuit 132 from the broadband signal at output tap 114 and therefore exhibits a high pass filter characteristic at its output, which is coupled to a second input of additive combining network 152.

The output of combining network 152 is coupled to inputs of additive combining networks 152 is coupled to inputs of additive combining networks 154 and 162. The output of combining network 150 is coupled to a second input of combining network 154. The output of combining network 160 is coupled to a second input of combining network 162, and to a third input of combining network 154. The output of combining network 154 is coupled to an input of an additive combining network 156, and the output of combining network 162 is coupled by way of a peaking control potentiometer to a second input of combining network 156.

Figure 8:
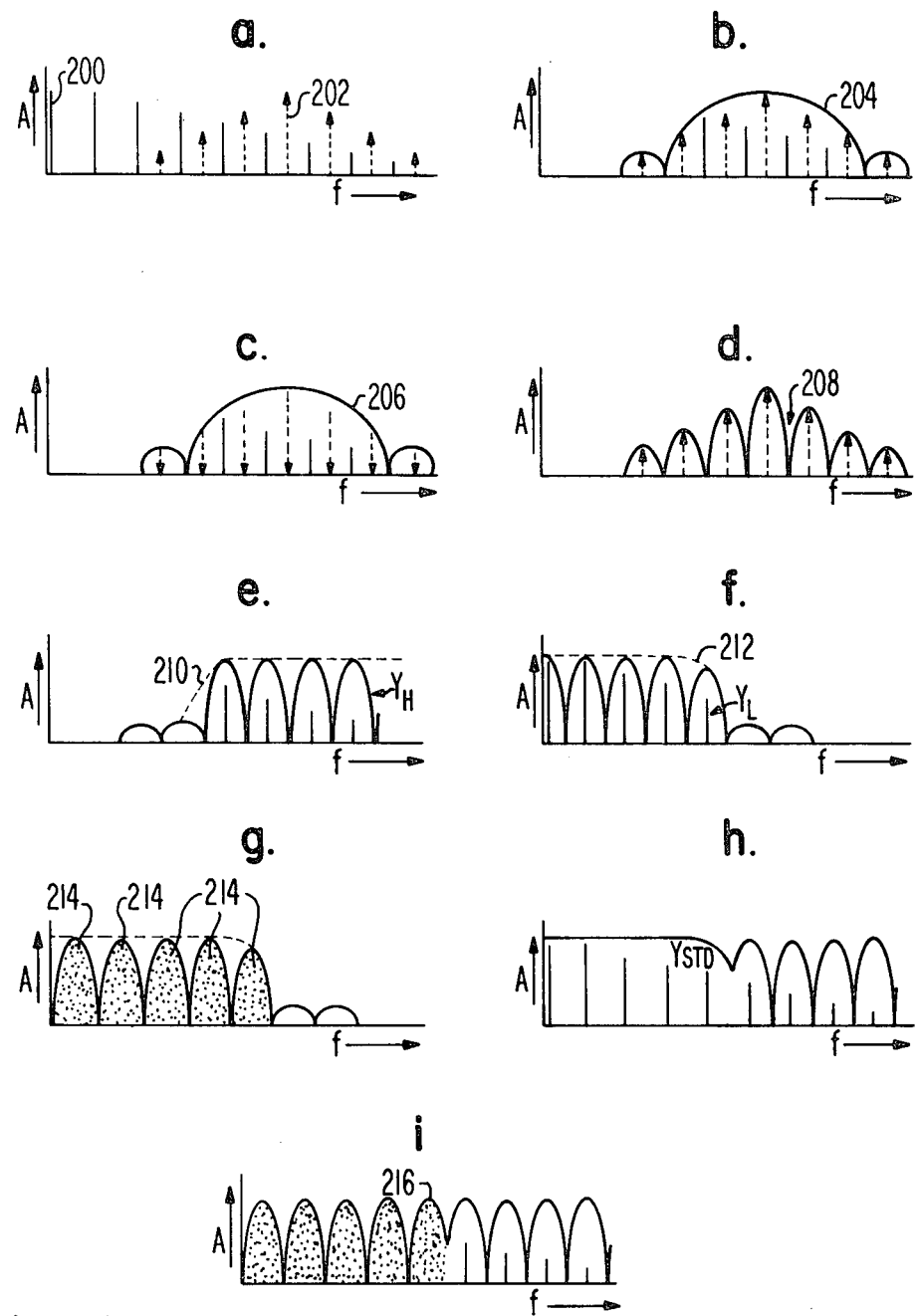
FIG. 8 illustrates waveforms explaining the operation of the system of FIG. 7.

The operation of the arrangement of FIG. 7 is illustrated by concurrent reference to the waveforms of FIG. 8. FIG. 8a illustrates an average distribution of luminance and chrominance signal information over the video band. FIG. 8a is only an average signal distribution; the actual signal content will vary as a function of picture content. FIG. 8a illustratively depicts luminance information by solid lines, declining with amplitude from line 200 as frequency increases. Interleaved with the luminance information lines are dashed arrows representing the phased chrominance information. The chrominance information exhibits peak amplitudes as shown at 202 in the vicinity of the chroma subcarrier frequency of 3.58 MHz in the NTSC color television system. In this example, it is assumed that a video signal of the characteristics of FIG. 8a is applied to input terminal 90.

FIG. 8b illustrates the bandpass response characteristic 204 at the output of the differential circuit 130. As in the case of the arrangements of FIGS. 5 and 6, the shape of the response characteristic is determined by the number of taps used in the filter arrangement, the tap spacings, and the weighting function values. Typically, the use of from five to fifteen taps will produce the desired responses for the summing and differential circuits. FIG. 8c illustrates a similar bandpass response characteristic 206 exhibited at the output of differential circuit 136. However, since the taps shown at 112 are 1-H later in time when the taps shown at 108, the chrominance signal components of FIG. 8c are reversed in phase with respect to the chrominance signal components of FIG. 8b, as indicated by the reversal of the direction of the dashed arrows. When signals at the outputs of the two differential circuits are subtractively combined by the network 140, the phase of the chrominance signals at one differential circuit output will be reversed so that the chrominance signal components will combine additively. The substantially equal amplitude luminance signal components will cancel, resulting in a combed, bandpassed chrominance response 208 at the output of combining network 140, as shown in FIG. 8d.

The additive combining network 152 combines two high-passed signals provided by combining networks 135 and 137. Since these signals are 1-H apart in time, their additive combination will produce a cancellation of the phase-opposed chrominance signal components and a reinforcement of the interleaved luminance signal components. Combining network 152 will therefore exhibit a combed high pass response characteristic 210, which contains high frequency luminance signals components $Y_H$, as shown in FIG. 8e. Likewise, the additive combination of the output signals of summing circuits 132 and 134 by combining network 150 produces a lowpass combed response 212 at the output of network 150 containing low frequency luminance information $Y_L$, as shown in FIG. 8f.

Combining network 160 subtractively combines the lowpass output signals of summing circuits 132 and 134. When these signals are subtractively combined, the luminance signal components are effectively combed out of the interleaved vertical detail information, which is contained in the shaded areas 214 of FIG. 8g. Combining network 154 combines the high frequency, low frequency, and vertical detail luminance information signals in proper amplitude relationships to produce a standard luminance signal $Y_{STD}$, as shown in FIG. 8h containing substantially all of the luminance information of the television signal.

A peaking signal is developed by combining the high frequency luminance information $Y_H$ with the vertical detail information in combining network 162. Signals provided at the output of combining network 162 provide full (both horizontal and vertical) aperture correction (peaking) with the network exhibiting a response characteristic 216 as shown in FIG. 8i. Adjustment of the peaking control potentiometer 164 determines the amount of the aperture correction signal that is combined with the standard luminance signal in combining network 156 to provide a luminance output signal with a desired amount of aperture correction.

In FIG. 7, the combined and bandpassed chrominance signal is derived from signal taps shown at 108 and 112, which are advanced in time from the respective taps 110 and 114 used to develop the luminance signal. The chrominance output signal will therefore be advanced in time with respect to the luminance output signal, to account for delays encountered by the chrominance signal during subsequent signal processing. By choosing chrominance taps 108 and 112 properly advanced in time with respect to luminance taps 110 and 114, the need for a luminance delay line in the television receiver may be avoided, with the processed luminance and chrominance information appearing in the correct time relationship for matrixing at the outputs of the processing circuitry.

Figure 9:
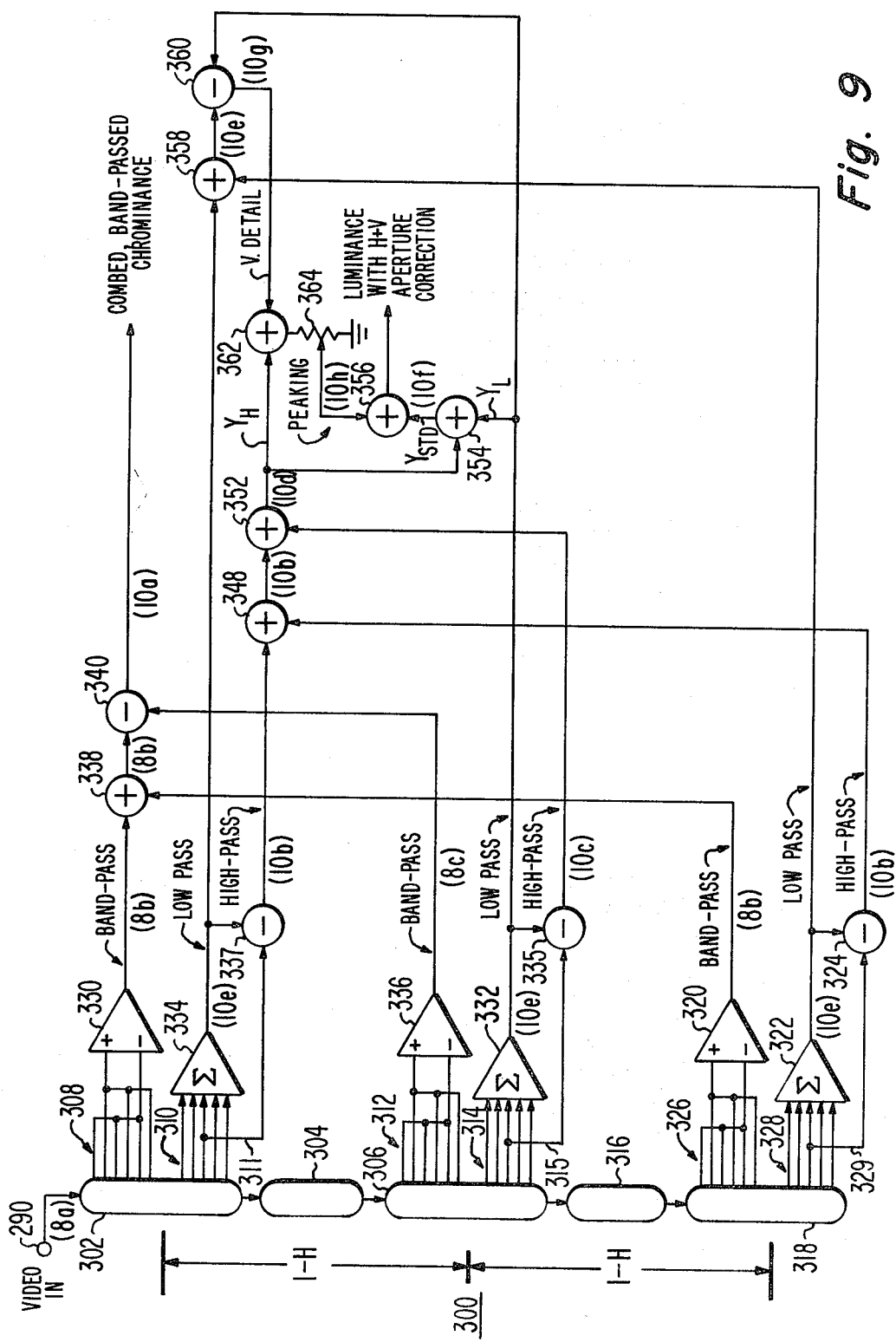
FIG. 9 illustrates, partially in block diagram form and partially in schematic diagram form, a signal separation system constructed in accordance with the principles of the present invention using a 2-H comb filter.

FIG. 9 illustrates a 2-H comb filter signal separation circuit with aperture correction. A video signal is applied to an input terminal 290, which is coupled to the input of a delay line 300. The video signal information passes serially through the delay line sections 302, 304, 306, 316 and 318 which have a total delay which is slightly greater than two horizontal line intervals (2-H). Delay line sections 302, 304, and 306 correspond to similar delay sections 102, 104, and 106 of delay line 100 of FIG. 7, and comprise a total delay in excess of 1-H, with output tap groups 308, 310, 312 and 314 corresponding to similar tap groups 108, 110, 112 and 114 of FIG. 7. Delay line 300 includes further sections 316 and 318, with delays corresponding to those of section 304 and 306, respectively. Respective ones of the taps shown at 326 provide signals delayed by 1-H with respect to corresponding taps shown at 312, and respective one of the taps shown at 328 provide signals delayed substantially by 1-H with respect to corresponding taps shown at 314.

Differential circuits 330, 336 and 320 are coupled to receive alternate ones of weighted tap signals at their two inputs from output taps at 308, 312 and 326, respectively, in the same manner as comparators 130 and 136 of FIG. 7. Summing circuits 332, 334 and 322 are coupled to receive weighted tap signals from taps shown at 314, 310 and 328, respectively, in the same manner as summing circuits 132 and 134 of FIG. 7.

In the arrangement of FIG. 9, the weighting function symbols at the output taps of the delay line 300 have been deleted for ease of illustration; however, it is to be understood that the output tap signals are to be properly weighted prior to application to the inputs of the summing circuits and the differential circuits, in the same manner as the taps shown in FIG. 7. Differential circuits 330, 336 and 320 therefore exhibit bandpass responses at their outputs, and the summing circuits 332, 334 and 322 exhibit lowpass response characteristics. A subtractive combining circuit 337 has inputs coupled to the output of summing circuit 334, and to center tap 311 of taps shown at 310 to provide a highpass filter characteristic at its output. In like manner, subtractive combining circuits 335 and 324 are coupled to summing circuits 332 and 322, respectively, and to taps 315 and 329 to provide high-pass output response characteristics.

An additive combining network 338 has inputs coupled to the outputs of differential circuits 320 and 330, and an output coupled to an input of a subtractive combining network 340. The combining network 340 has a second input coupled to the output of differential circuit 336, and an output at which a combed and bandpassed chrominance signal is produced.

The output of summing circuit 334 is coupled to an input of an additive combining network 358. The output of summing circuit 322 is coupled to a second input of combining network 358. An additive combining network 348 has inputs coupled to the outputs of subtractive combining networks 337 and 324, and an output coupled to an input of an additive combining network 352. The combining network 352 has a second input coupled to the output of subtractive combining network 335, and an output coupled to inputs of additive combining networks 354 and 362.

A subtractive combining network 360 has a first input coupled to the output of combining network 358 and a second input coupled to the output of summing circuit 332. The output of combining network 360 is coupled to a second input of combining network 362. Combining network 354 has a second input coupled to the output of summing circuit 332, and an output coupled to an input of an additive combining circuit 356. The output of combining network 362 is coupled by way of a peaking control potentiometer 364 to a second input of combining circuit 356.

Figure 10:
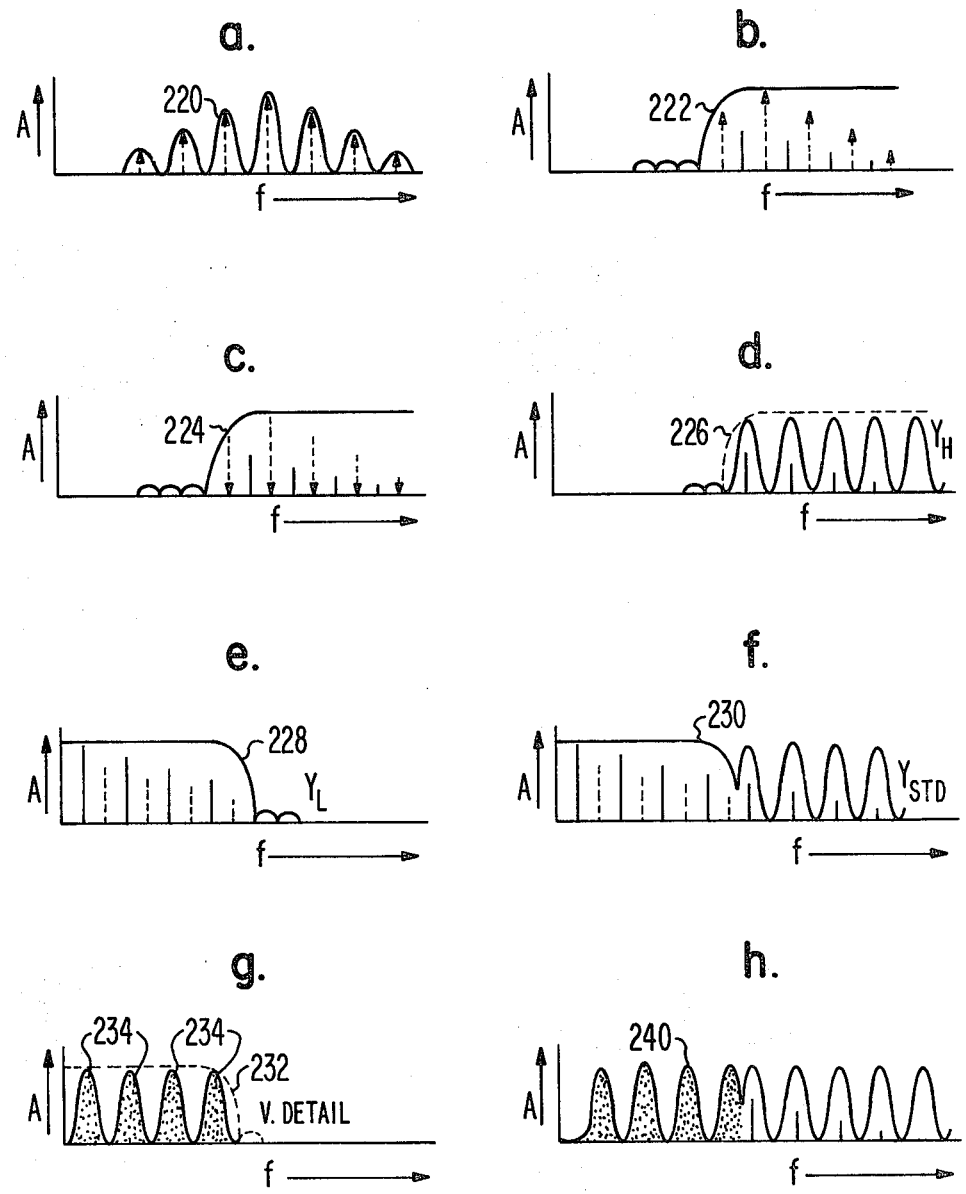
FIG. 10 illustrates waveforms explaining the operation of the system of FIG. 9.

The operation of the signal separation system of FIG. 9 may be understood by concurrently referring to the illustrative waveforms of FIGS. 8 and 10. The video signal applied to input terminal 290 may have a nominal signal component content as shown in FIG. 8a. Differential circuits 330 and 320 exhibit bandpass characteristics as shown in FIG. 8b. Since the signals at the outputs of the two differential circuits are 2-H apart in time, the luminance and chrominance signals will both reinforce each other in combining network 338, which, with proper amplitude scaling, will exhibit a response characteristic as shown in FIG. 8b. Differential circuit 336 also exhibits a bandpass response characteristic, with chrominance signal components reversed in phase with respect to the output of combining network 338 as shown in FIG. 8c due to the 1-H time separation between output signals of differential circuit 336 with respect to differential circuits 320 and 330. In the subtractive combining network 340, luminance signal component cancellation and chrominance signal reinforcement will occur when the applied signals are combined in a proper amplitude relationship, with the combining network 340 exhibiting a combed, bandpass response characteristic, as shown in FIG. 10a. The combed response characteristic 220 of FIG. 10a is seen to be sinusoidal due to the 2-H combining, as compared to the 1-H combed output response shown in FIG. 8d.

Combining networks 337 and 324 exhibit high pass response characteristics, as shown in FIG. 10b. Output signals from these two networks are combined by combining network 348 in appropriate amplitude relationships, which will exhibit a response characteristic 222 as shown in FIG. 10b. Combining network 335 exhibits a high pass response characteristic 224 as shown in FIG. 10c, with chrominance signal components reversed in phase with respect to FIG. 10b, as indicated by the oppositely directed arrows. Signals from combining networks 348 and 335 are additively combined in a proper amplitude relationship by combining network 352, which produces a combed, high pass output response 226 as shown in FIG. 10d. The output of combining circuit 352 thus contains combed high frequency luminance signals $Y_H$.

Summing circuits 334, 332 and 322 each exhibit a lowpass response characteristic 228, as shown in FIG. 10e. In this FIGURE, the solid lines represent luminance signal components, and the dashed lines represent interleaved vertical detail information. Signals from summing circuits 334 and 322 are combined by combining network 358, which exhibits a similar output response characteristic 228. Since the signals provided at the output of summing circuit 332 contain both low frequency luminance information and vertical detail information, the signals are termed low frequency luminance signals $Y_L$ in FIG. 9. These signals are combined with the high frequency luminance information $Y_H$ in a proper amplitude relationship by combining network 354 to produce a standard luminance information signal $Y_{STD}$. The output of combining network 354 exhibits a response characteristic 230, as shown in FIG. 10f.

The subtractive combining circuit 360 combines signals occupying response characteristics as shown in FIG. 10e. The subtractive combining provided by network 360 will produce a combed output response 232, as shown in FIG. 10g, in which the interleaved luminance signal components have been removed from the vertical detail information. The vertical detail information occupies the shaded areas 234. The vertical detail information is combined with the high frequency luminance information $Y_H$ by combining network 362, which exhibits an output response 240 as shown in FIG. 10h. The output of combining network 362 contains peaking signal information, which is added to the standard luminance signal $Y_{STD}$ by combining network 356 in an amount determined by the setting of the peaking control potentiometer 364. A luminance signal with both horizontal and vertical aperture correction is thus provided at the output of combining network 356.

As in the case of the arrangement of FIG. 7, the taps 308, 312 and 326 which are used to derive the separated chrominance information are advanced in time with respect to taps 310, 314 and 328 which are used to develop the separated luminance information. As explained in conjunction with FIG. 7, the output chrominance signals will be advanced in time with respect to the luminance signals to take into consideration the delays encountered by the chrominance information during subsequent signal processing.

What is claimed is:

1. In a television receiver, including a source of composite video information signals comprising luminance signal components occupying a given band of frequencies and chrominance signal components interleaved with said luminance signal components over a high frequency portion of said given band of frequencies; apparatus comprising:
a delay line having an input coupled to receive said video information signals and including a plurality of serially coupled signal transfer stages through which said video information signals are sequentially transferred, said delay line including, in cascade arrangement, a first group of sequential delay stages having output taps at which output signals exhibiting differing delays with respect to said input signals appear, an intermediate group of sequential delay stages and a second group of sequential delay stages having output taps, wherein respective ones of said signals at said output taps of said second group exhibit delays substantially equal to the duration of an integer multiple of one horizontal television signal line with respect to respective ones of said signals at said output taps of said first group of stages;
means for weighting and combining the signals appearing at said output taps of said first group of stages to produce a first transversal filter exhibiting at an output an output response having a first predetermined transversal filter response characteristic;
means for weighting and combining the signals appearing at said output taps of said second group of stages to produce a second transversal filter exhibiting at an output an output response having a second predetermined transversal filter response characteristic; and means having inputs coupled to the outputs of said first and second transversal filters for combining the signals produced thereat to produce a comb filtered signals occupying a portion of said given band of frequencies.

2. In a television receiver, including a source of composite video information signals comprising luminance signal components occupying a given band of frequencies and chrominance signal components interleaved with said luminance signal components over a high frequency portion of said given band of frequencies; apparatus for producing a comb filtered and bandwidth limited chrominance signal comprising:

a delay line having an input coupled to receive said video information signals and including a plurality of serially coupled signal transfer stages through which said video information signals are sequentially transferred, said delay line including, in cascade arrangement, a first group of sequential delay stages having output taps at which output signals exhibiting differing delays with respect to said input signals appear, an intermediate group of sequential delay stages and a second group of sequential delay stages having output taps, wherein respective ones of said signals at said output taps of said second group exhibit delays substantially equal to the duration of one horizontal television signal line with respect to respective ones of said signals at said output taps of said first group of stages;

means for weighting and combining the signals appearing at said output taps of said first group of stages to produce a first transversal filter exhibiting at an output an output response in which signal frequencies below said high frequency portion are attenuated relative to signal frequencies of said high frequency portion of said given band of frequencies;

means for weighting and combining the signals appearing at said output taps of said second group of stages to produce a second transversal filter exhibiting at an output an output response in which signal frequencies below said high frequency portion are attenuated relative to signal frequencies of said high frequency portion of said given band of frequencies; and means having input coupled to the outputs of said first and second transversal filters for subtractively combining the signals produced thereat to produce a comb filtered chrominance signal occupying said high frequency portion of said given band of frequencies.

3. The arrangement of claim 2, wherein said delay line further includes a third group of sequential stages located between said first and second groups of stages and having output taps at which output signals exhibiting differing delays with respect to said video input signals appear; and a fourth group of sequential stages separated from said third group of stages by said second group of stages, and having output taps at which output signals exhibiting differing delays with respect to said video input signals appear, wherein respective ones of said signals at said output taps of said fourth group of stages are delayed substantially by the duration of one horizontal television line with respect to respective ones of said signals at said output taps of said third group of stages; and further comprising:

means for weighting and combining the signals appearing at said output taps of said third group of stages to produce a third transversal filter exhibiting at an output an output response in which signal frequencies of said high frequency portion are attenuated relative to signal frequencies below said high frequency portion of said given band of frequencies;

means for weighting and combining the signals appearing at said output taps of said fourth group of stages to produce a fourth transversal filter exhibiting at an output an output response in which signal frequencies of said high frequency portion are attenuated relative to signal frequencies below said high frequency portion of said given band of frequencies; and means having inputs coupled to the outputs of said third and fourth transversal filters for additively combining the signals developed thereat to produce a comb filtered luminance signal occupying that portion of said given band of frequencies below said high frequency portion.

4. The arrangement of claim 3, further comprising:

means having inputs coupled to the outputs of said third and fourth transversal filters for subtractively combining the signals developed thereat to produce a comb filtered vertical detail signal; and means for additively combining said vertical detail signal with said comb filtered luminance signal to produce a luminance signal with restored vertical detail information.

5. In a television receiver, including a source of composite video information signals comprising luminance signal components occupying a given band of frequencies and chrominance signal components interleaved with said luminance signal components over a high frequency portion of said given band of frequencies; apparatus for separating said luminance and chrominance signal components comprising:

a delay line having an input coupled to receive said video information signals and including a plurality of serially coupled signal transfer stages through which said video information signals are sequentially transferred, said delay line including first, second, third and fourth cascaded groups of sequential stages having output taps at which output signals exhibiting progressively increasing delays with respect to said video input signals appear, wherein respective ones of said signals at said output taps of said first and second groups of stages exhibit delays substantially equal to the duration of one horizontal television signal line with respect to respective ones of said signals at said output taps of said third and fourth groups of stages;

means for combining the signals appearing at said output taps of said first and third groups of stages to produce separated chrominance signals exhibiting a first delay characteristic with respect to said video information signals at said input of said delay line; and means for combining the signals appearing at said output taps of said second and fourth groups of stages to produce separated luminance signals exhibiting a delay characteristic with respect to said video information signals at said input of said delay line which is greater than said delay of said separated chrominance signals.

6. In a television receiver, including a source of composite video signals comprising luminance signal components occupying a given band of frequencies and chrominance signal components interleaved with said luminance signal components over a high frequency portion of said given band of frequencies; and a comb filter circuit responsive to said video signals for separating said luminance and chrominance signals into two comb filtered signals; apparatus for producing a bandwidth-limited chrominance signal and a luminance signal including horizontal and vertical detail information comprising:

a first lowpass filter having an input coupled to receive said comb filtered chrominance signals and an output, and exhibiting a first given delay characteristic;

a first delay element having an input coupled to receive said comb filtered chrominance signals and an output and exhibiting a delay characteristic substantially equal to that of said first lowpass filter;

first combining means, having a first input coupled to the output of said first lowpass filter and a second input coupled to the output of said first delay element, and responsive to the signals provided by said first lowpass filter and said first delay element for subtractively combining said signals to produce comb filtered chrominance signals at an output exhibiting a high-pass filter characteristic;

a second lowpass filter having an input coupled to receive said comb filtered luminance signals and an output, and exhibiting a second given delay characteristic;

a second delay element having an input coupled to receive said comb filtered luminance signals and an output and exhibiting a delay characteristic substantially equal to that of said second lowpass filter;

second combining means, having a first input coupled to the output of said second lowpass filter and a second input coupled to the output of said second delay element, for subtractively combining the signals provided by said second lowpass filter and said second delay element to produce comb filtered luminance signals at an output exhibiting a high-pass filter characteristic;

third combining means, having a first input coupled to the output of said first lowpass filter and a second input coupled to the output of said second delay element for additively combining said signals provided by said first lowpass filter and said second delay element to provide a restored luminance signal including vertical detail information at an output;

fourth combining means responsive to signals provided at the outputs of said first lowpass filter and said second combining means for additively combining the signals provided by said first lowpass filter and said second combining means to develop a peaking signal including both horizontal and vertical detail information at an output; and fifth combining means having inputs coupled to the outputs of said third and fourth combining means for controllably combining a portion of said peaking signal with said restored luminance signal.

7. In a television receiver, including a source of composite video signals comprising luminance signal components occupying a given band of frequencies and chrominance signal components interleaved with said luminance signal components over a high frequency portion of said given band of frequencies; and a comb filter circuit responsive to said video signals for separating said luminance and chrominance signals into two comb filtered signals; apparatus for producing a bandwidth-limited chrominance signal and luminance signal including horizontal and vertical detail information comprising:

a first delay line having an input coupled to receive said comb filtered chrominance signals, a first group of sequential output taps, and a second group of sequential output taps exhibiting delays greater than the taps of said first group with respect to said input;

a plurality of weighting function circuits coupled in series with respective ones of said output taps to develop weighted tapped output signals;

a differential circuit having first and second inputs respectively coupled to alternate ones of said weighting function circuits of said output taps of said first group for receiving combined weighted tap signals, and an output exhibiting a bandpass filter characteristic at which a combed chrominance signal is produced;

a first summing network having a plurality of inputs coupled to respective ones of said output taps of said second group for receiving weighted tapped signals, and an output exhibiting a lowpass filter characteristic;

a second delay line having an input coupled to receive said comb filtered luminance signals and a group of sequential output taps exhibiting respective delays substantially equalling the respective delays of said second group of output taps of said first delay line;

a plurality of weighting function circuits coupled in series with respective ones of said output taps of said second delay line to develop weighted tapped output signals;

a second summing network having a plurality of inputs coupled to respective ones of said output taps of said second delay line for receiving weighted tapped signals, and an output exhibiting a lowpass filter characteristic;

first combining means having a first input coupled to the output of said second summing network, and a second input coupled to a central one of said output taps of said second delay line, and an output for producing combed luminance signals and exhibiting a high-pass filter characteristic;

second combining means, having a first input coupled to the output of said first summing network and a second input coupled to a central one of said output taps of said second delay line for additively combining said signals provided by said first summing network and said central output tap to provide a restored luminance signal including vertical detail information at an output;

third combining means responsive to signals provided at the outputs of said first combining means and said first summing network for additively combining the signals provided by said first combining means and said first summing network to develop a peaking signal including both horizontal and vertical detail information at an output; and fourth combining means having inputs coupled to the outputs of said second and thid combining means for controllably combining a portion of said peaking signal with said restored luminance signal.

8. In a television receiver, including a source of composite video signals comprising luminance signal components occupying a given band of frequencies and chrominance signal components interleaved with said luminance signal components over a high frequency portion of said given band of frequencies;

apparatus for producing separated luminance and chrominance signal components comprising:

a delay line having an input for receiving said video signals and including a plurality of serially coupled signal transfer stages through which said video signals are sequentially transferred, said delay line including first, second, third and fourth groups of stages having output taps at which signals exhibiting incrementally greater delays with respect to signals at said input appear, said delay line exhibiting a delay which is at least as great as the scanning time of one horizontal line interval of said video signals, wherein signals produced at respective ones of said output taps of said third group of stages are delayed by one horizontal line interval with respect to signals produced at said output taps of said first group of stages, and wherein signals produced at respective ones of said output taps of said fourth group of stages are delayed by one horizontal line interval with respect to signals produced at said output taps of said second group of stages;

a plurality of weighting function circuits respectively coupled in series with respective ones of said output taps of said delay line;

a first differential circuit having a first input coupled to alternate ones of said weighting function circuits of said first group of output tapped stages, a second input coupled to the remaining ones of said weighting function circuits of said first group of output tapped stages, and an output exhibiting a band-pass response characteristic;

a second differential circuit having a first input coupled to alternate ones of said weighting function circuits of said third group of output tapped stages, a second input coupled to the remaining ones of said weighting function circuits of said third group of output tapped stages, and an output exhibiting a band-pass response characteristic;

first means, having a first input coupled to the output of said first differential circuit, a second input coupled to the output of said second differential circuit, and an output exhibiting a band-pass response characteristic, for subtractively combining signals at the outputs of said differential circuits to produce comb-filtered chrominance signals;

a first summing circuit having inputs coupled to respective ones of said weighting function circuits of said second group of output tapped stages and an output exhibiting a lowpass response characteristic;

a second summing circuit having inputs coupled to respective ones of said weighting function circuits of said fourth group of output tapped stages and an output exhibiting a lowpass response characteristic;

second means having a first input coupled to the output of said first summing circuit, a second input coupled to a central one of said second group of output tapped stages, and an output exhibiting a high-pass response characteristic for subtractively combining the signals received at its inputs;

third means having a first input coupled to the output of said second summing circuit, a second input coupled to a central one of said fourth group of output tapped stages, and an output exhibiting a high-pass response characteristic, for subtractively combining the signals received at its inputs; and means for combining the signals provided at the outputs of said first and second summing circuits and said second and third means for producing comb filtered luminance signals.

9. In a television receiver, including a source of composite video signals comprising luminance signal components occupying a given band of frequencies and chrominance signal components interleaved with said luminance signal components over a high frequency portion of said given band of frequencies; apparatus for producing separated luminance and chrominance signal components comprising:

a delay line having an input for receiving said video signals and including a plurality of serially coupled signal transfer stages through which said video signals are sequentially transferred, said delay line including first, second and third group of stages having output taps at which weighted output signals exhibiting progressively greater delays with respect to signals at said input appear, said second group of output taps providing signals delayed substantially by the interval of one horizontal television line with respect to taps of said first group, and said third group of output taps providing signals delayed substantially by the interval of one horizontal television line with respect to taps of said second group;

means, coupled to a portion of the output taps of each of said first, second and third group of taps for combining the weighted output signals appearing at said taps to produce a comb filtered, band passed chrominance signal; and means, coupled to the remaining output taps of each of said first, second and third groups of taps exclusive of said portions for combining the weighted output signals appearing at said remaining taps to produce a comb filtered luminance signal.

10. In a television receiver, including a source of composite video information signals comprising luminance signal components occupying a given band of frequencies and chrominance signal components interleaved with said luminance signal components over a high frequency portion of said given band of frequencies; apparatus comprising:

a delay line having an input coupled to receive said video information signals and including a plurality of serially coupled signal transfer stages through which said video information signals are sequentially transferred, said delay line including, in cascade arrangement, a first group of sequential stages having output taps at which output signals exhibiting differing delays with respect to said video input signals appear, an intermediate group of stages, and a further stage having an output tap at which signals are produced which exhibit a delay substantially equal to the duration of an interger multiple of one horizontal television signal line with respect to signals produced at one of said output taps of said first group of stages;

means for weighting and combining the signals appearing at said output taps of said first group of stages to produce a first transversal filter exhibiting at an output, an output response having a predetermined transversal filter response characteristic; and means having inputs coupled to the output of said first transversal filter and said tap of said further stage for combining the signals produced thereat to produce a comb filtered signal occupying a portion of said given band of frequencies.

11. In a television signal receiver, including a source of video signals, filter apparatus responsive to said video signals, comprising:

delaying means coupled to said source of video signals for delaying applied signals, and including a delay line having a plurality of signal taps, said delay line exhibiting a given time delay between an input and an output;

weighted signal coupling means, coupled to respective ones of said signal taps of said delay line, for weighting signals passing therethrough;

means, coupled to said weighted signal coupling means, and operating in combination with said delay line for producing an output signal exhibiting a first amplitude versus frequency response characteristic; and means, having a first input coupled to the output of said first signal producing means, and a second input coupled to said delaying means for receiving unweighted input signals delayed by an amount of time which is equal to at least half of said given time delay, for combining applied signals to produce an output signal exhibiting a second amplitude versus frequency response characteristic, wherein said signals exhibiting said first and second frequency responses correspond to luminance and chrominance signals, respectively.

12. The television signal receiver set forth in claim 11 wherein the video signals are digital signals.

* * * * *

UNITED STATES PATENT AND TRADEMARK OFFICE
CERTIFICATE OF CORRECTION

PATENT NO. : 4,466,016

DATED : Aug. 14, 1984

INVENTOR(S) : Dalton H. Pritchard

It is certified that error appears in the above-identified patent and that said Letters Patent is hereby corrected as shown below:

| | |
|---|---|
| Column 6, line 64 | "as" should be --at--. |
| Column 9, line 9 | " when" should be --than--. |
| Column 9, line 30 | "signals" should be --signal--. |
| Column 9, line 64 | after "taps" insert --at--. |
| Column 10, line 25 | "one" should be --ones--. |
| Column 13, line 4 | "signals" should be --signal--. |
| Column 13, line 44 | "input" should be --inputs--. |

Claim 11 should read as follows:

In a television signal receiver, including a source of video signals, filter apparatus responsive to said video signals, comprising:

UNITED STATES PATENT AND TRADEMARK OFFICE
CERTIFICATE OF CORRECTION

PATENT NO. : 4,466,016

DATED : Aug. 14, 1984

INVENTOR(S) : Dalton H. Pritchard

It is certified that error appears in the above-identified patent and that said Letters Patent is hereby corrected as shown below:

delaying means coupled to said source of video signals for delaying applied signals, and including a delay line having a plurality of signal taps, including a center tap;

respective means coupled to said taps for weighting signals occurring thereat;

means, for combining signals from said weighting means including signals from said center tap and for producing, at an output terminal thereof, an output signal exhibiting a first amplitude versus frequency response characteristic; and means, having a first input coupled to the output of said means for combining signals, and a second input coupled to said center tap for applying delayed video signals and for combining applied signals to produce an output signal exhibiting a second amplitude versus frequency response characteristic, wherein said first frequency response characteristic is one of a relatively high pass or low pass frequency response with respect to the frequency spectrum of video signals and the second frequency response characteristic is the other of said high pass and low pass frequency response.

Signed and Sealed this

Twelfth Day of February 1985

[SEAL]

Attest:

DONALD J. QUIGG

Attesting Officer     Acting Commissioner of Patents and Trademarks